(12) United States Patent
Chang et al.

(10) Patent No.: US 7,497,380 B2
(45) Date of Patent: *Mar. 3, 2009

(54) 2D CODING AND DECODING BARCODE AND ITS METHOD THEREOF

(75) Inventors: Zhiguo Chang, Guangdong (CN); Peng Wang, Beijing (CN); Yingfeng Lv, Guangdong (CN); Fu Zhang, Guangdong (CN); Xiaoyun Ding, Guangdong (CN)

(73) Assignee: Shenzhen SYSCAN Technology Co., Ltd., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 11/652,981

(22) Filed: Jan. 12, 2007

(65) Prior Publication Data

US 2007/0114285 A1 May 24, 2007

Related U.S. Application Data

(62) Division of application No. 10/883,131, filed on Jun. 30, 2004, now Pat. No. 7,264,174.

(30) Foreign Application Priority Data

Mar. 15, 2004 (CN) .................. 2004 1 0022052

(51) Int. Cl.
*G06K 7/10* (2006.01)
(52) U.S. Cl. ..................... 235/462.09; 235/462.04; 235/494
(58) Field of Classification Search ............... 235/494, 235/462.04, 462.09
See application file for complete search history.

(56) References Cited

U.S. PATENT DOCUMENTS 7,264,174 B2 * 9/2007 Chang et al. ............... 235/494

* cited by examiner

*Primary Examiner*—Karl D. Frech
(74) *Attorney, Agent, or Firm*—Raymond Y. Chan; David and Raymond Patent Firm (57) ABSTRACT

A two-dimensional barcode includes a plurality of macro modules arranged in a two-dimensional array in a spiral sequence, each of macro modules includes a predetermined number of data unit modules for storing data codewords of a predetermined binary stream of bits, a predetermined number of cluster unit modules for storing a predetermined cluster number representing a location of the macro module, and a predetermined number of rim unit modules which possess a predetermined color to form a rim of the macro module. The rim unit modules of two adjacent macro modules are contrasting with each other to enhance identification of the respective macro module.

20 Claims, 12 Drawing Sheets

2D CODING AND DECODING BARCODE AND ITS METHOD THEREOF

CROSS REFERENCE OF RELATED APPLICATION

This is a divisional application of a non-provisional application Ser. No. 10/883,131 filed on Jun. 30, 2004 now U.S. Pat. No. 7,264,174 which claimed priority of foreign application 200410022052.5 filed on Mar. 15, 2004 in China.

BACKGROUND OF THE PRESENT INVENTION

1. Field of Invention

The present invention relates to a bar-code, and more particularly to a two-dimensional bar code, a method for encoding data into a two-dimensional bar code symbol, and a method for decoding the two-dimensional bar code symbol into a predetermined set of data.

2. Description of Related Arts

A conventional two-dimensional bar code usually has three portions: characteristic pattern portion, format information portion and data codewords portion. The characteristic pattern portion directs image recognition algorithms to recognize and orient the bar code symbol. The format information portion stores some parameters related to the symbol format and data error correction. The data codewords portion stores data encoded after error correction. The bar code symbol cannot be recognized if its characteristic pattern portion and format information portion are damaged to some extent. In the bar code symbol these two portions are vulnerable areas that reduce the reliability of the two-dimensional bar code.

Figure 1:
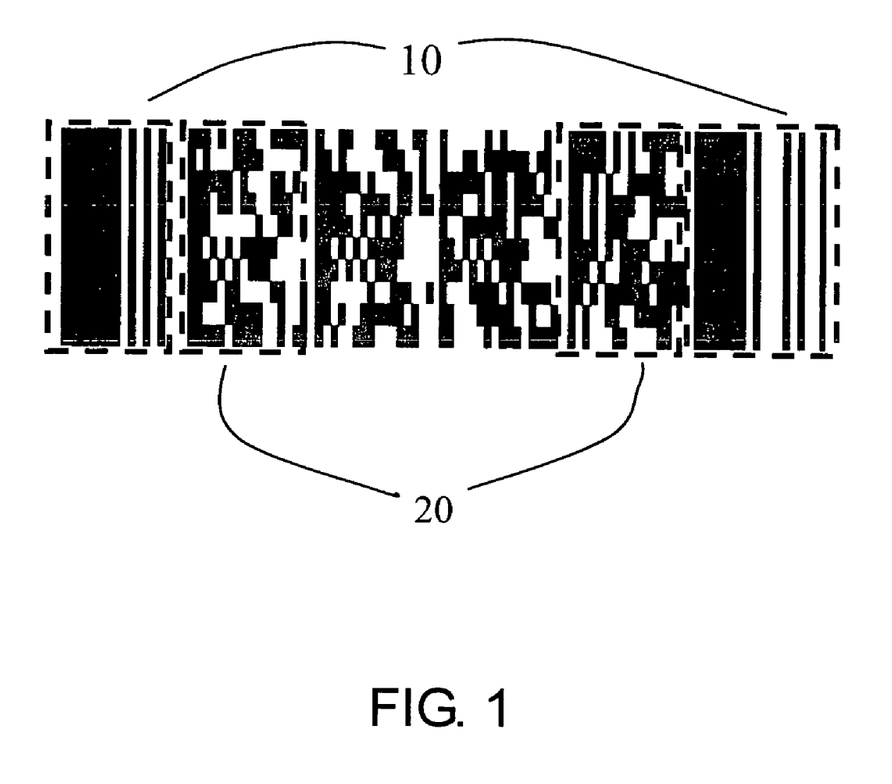
FIG. 1 is a conventional two-dimensional barcode showing 'PDF417'.

Referring to FIG. 1 of the drawings, a two dimensional bar code 'PDF417' is illustrated. Those bars and spaces of varying widths at both left and right ends of the symbol are its characteristic pattern portions 10, and the regions close to the characteristic pattern portions 10 are its format information portions 20. If the characteristic pattern portions 10 and the format information portions 20 are damaged to a certain extent, the symbol cannot be identified properly.

Figure 2:
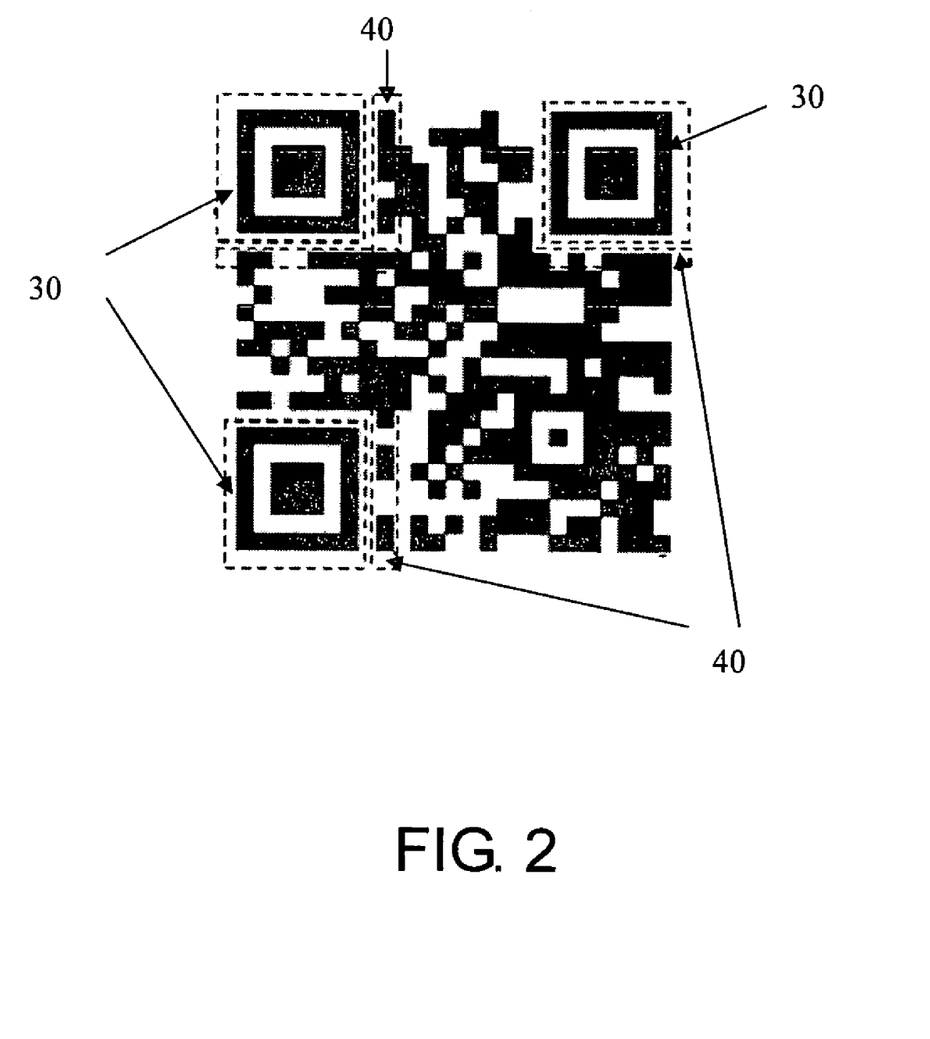
FIG. 2 is a conventional two-dimensional barcode showing 'QR'.

Referring to FIG. 2 of the drawings, another two-dimensional bar code 'QR' is illustrated. Its characteristic pattern portions 30 are at the top left corner, at the top right corner and at the bottom left corner. In the vicinity of the characteristic pattern portions 30, there are three small regions marked out with dashed lines which are the format information portions 40. If the characteristic pattern portions 30 and the format information portions 40 are damaged to a certain extent, the symbol cannot be recognized properly.

From past experience, one skilled in the art would obviously come to a conclusion that a major drawback of the above-mentioned conventional two-dimensional bar codes is that their characteristic pattern portion and format information portion are incapable of distinctively and individually identifiable, vulnerable and generally have little resistance of anti-deformation.

SUMMARY OF THE PRESENT INVENTION

A main object of the present invention is to provide a two-dimensional barcode with enhanced reliability, and minimization of defect sensitivity in such a manner that even if the barcode has various defects or irregularities, such as a damaged corner portion, a scratch, or a stain which partially obscure the barcode as a whole, it can still be accurately recognized to represent a predetermined symbol.

Another object of the present invention is to provide a two-dimensional barcode which does not require format information portion to constitute a representation of the predetermined symbol, such that the above-mentioned difficulty of recognizing a defective format information portion of a conventional two-dimensional barcode can be substantially avoided.

Another object of the present invention is to provide a two-dimensional barcode which may be decoded and computerized efficiently by a conventional computer system so that the two-dimensional barcode can be adapted for widespread application and compatible with most commercial and business systems.

Another object of the present invention is to provide a method of encoding a predetermined form of data into the two-dimensional barcode having the above-mentioned reliability, and reduced defects sensitivity.

Another object of the present invention is to provide a method of decoding the two-dimensional barcode symbol into a predetermined form of data for retrieval of information as represented by the barcode.

Accordingly, in order to accomplish the above objects, the present invention provides a two-dimensional barcode, comprising:

a plurality of macro modules arranged in a two-dimensional array in a predetermined order, wherein each of the macro modules comprises:

a predetermined number of data unit modules which store data codewords of a predetermined binary stream of bits;

a predetermined number of cluster unit modules which store a predetermined cluster number representing a location of the macro module; and a predetermined number of rim unit modules which possess a predetermined color to form a rim of the macro module, wherein the rim unit modules of two adjacent macro modules are contrasting with each other to enhance identification of the respective macro module, wherein the data unit modules, the cluster unit modules and the rim unit modules are arranged in a rectangular array in such a manner that the rim unit modules form the rim of the macro module which surrounds the data unit modules and the cluster unit modules to represent a barcode Furthermore, the present invention provides a method of encoding a predetermined set of data in a binary stream into a two-dimensional barcode, comprising the steps of:

(a) dividing the binary data stream into data codewords having a predetermined bit length, wherein each of the data codewords form a macro module of the two-dimensional barcode, and the macro modules form a two-dimensional array in a predetermined order; and (b) for each of the macro module of each of the data codewords, generating a predetermined number of rim unit modules forming a rim of the corresponding macro module, a predetermined number of cluster unit modules storing a predetermined position of the corresponding macro module in the two-dimensional array, and a predetermined number of data unit modules storing the corresponding data codewords.

Last but not least, the present invention further provides a method of decoding a two-dimensional barcode comprising a plurality of macro modules into a predetermined set of data, wherein the decoding method comprises the steps of:

(1) capturing the two-dimensional barcode to generate a gray scale digital image having gray value for each pixel of the digital image;

(2) computing the gray values of the pixels to obtain a distribution of the gray values for determining a threshold value for the digital image;

(3) converting the gray scale image into a bilevel image having two contrasting color levels;

(4) identifying each of the unit modules from the digital image for each of the macro modules;

(5) retrieving a bit value of each of the unit modules in a predetermined order to obtain a data bit stream of each of the macro modules; and (6) combining the data bit streams of each of the macro modules to form a binary stream of data for the two-dimensional barcode.

These and other objectives, features, and advantages of the present invention will become apparent from the following detailed description, the accompanying drawings, and the appended claims.

DETAILED DESCRIPTION OF THE PREFERRED EMBODIMENT

Figure 3:
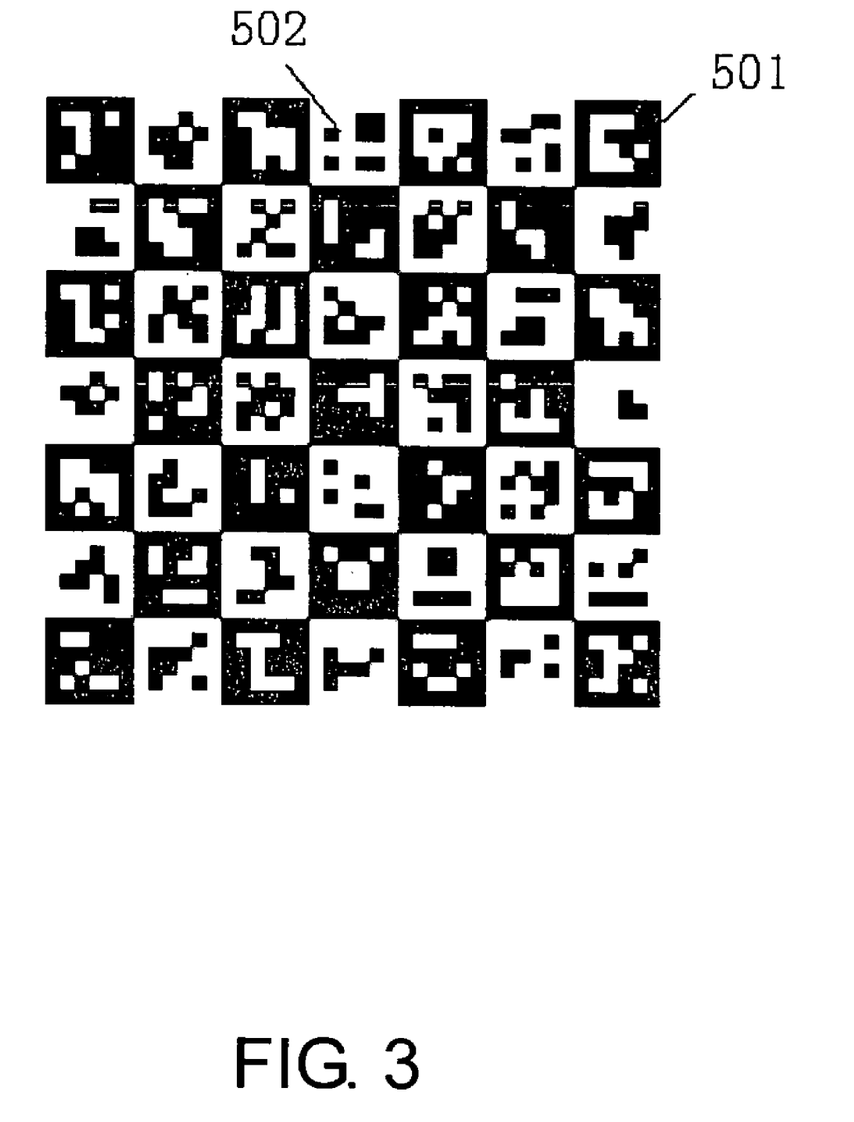
FIG. 3 is a two-dimensional barcode according to a preferred embodiment of the present invention.

Referring to FIG. 3 of the drawings, a two-dimensional barcode according to a preferred embodiment of the present invention is illustrated, in which the barcode comprises a plurality of macro modules arranged in a two-dimensional array in a predetermined order.

Each of the macro modules comprises a predetermined number of data unit modules 100 which store data codewords of a predetermined binary stream of bits, a predetermined number of cluster unit modules 300 which store a predetermined cluster number representing a location of the respective macro module within the rectangular array, and a predetermined number of rim unit modules 200 which possess a predetermined color to form a rim of that macro module, wherein the rim unit modules of two adjacent macro modules are contrasting with each other to enhance accurate identification of the respective adjacent macro modules.

Moreover, the data unit modules 100, the cluster unit modules 300, and the rim unit modules 200 are arranged in a rectangular array in such a manner that the rim unit modules 200 form a rim of the macro module which surround the data unit modules and the cluster unit modules 300 to represent the barcode.

The two-dimensional barcode is utilized to encode a predetermined form of information which should be readable by conventional computer system so as to facilitate sound business practices, such as effective management and record of product or transactions details. According to the preferred embodiment of the present invention, the encoded information is embodied as a string of binary numbers forming a stream of bits. This stream of bits is broken up and divided into several data codewords each having a same number of bits of having predetermined certain length.

In order to minimize the effect of mistake during a typical translating method from the barcode to essential data, the binary stream of bits further contains error correction codewords which are generated by use of Reed-Solomon encoding algorithm, and are out into the data codewords.

Referring to FIG. 3 of the drawings, the two-dimensional barcode is rectangular in shape formed from the plurality of macro modules which are also typically rectangular in shape, such as the macro module "501" and macro module "502" shown in FIG. 3 of the drawings. Each of the macro modules comprises of Num×Num (where Num is a natural number and greater than 3) unit modules arranged in the rectangular array. Each of the unit modules is rectangular in shape, and is either dark colored or light (such as white) colored so as to represent a binary value carried by that particular unit module, wherein a bit value of 1 is assigned to each dark colored unit module, and a bit value of 0 is assigned to each light colored unit module. According to the preferred embodiment, one codeword corresponds to one macro module.

Figure 4:
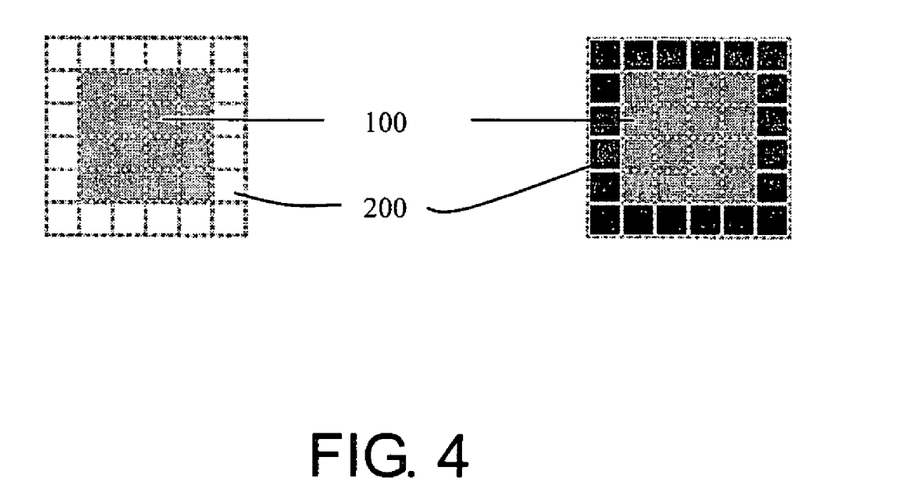
FIG. 4 are schematic diagrams of a white rim macro module and a black rim macro module according to the above preferred embodiment of the present invention respectively.

Referring to FIG. 4 of the drawings, the rim unit modules 200 of each of the macro modules is either black or white in color to form the respective colored rim of that particular macro module. The macro modules are arranged in the rectangular array in such a manner their respective rims represent alternate black and white color along a horizontal and a vertical direction of that particular rectangular array. FIG. 4A illustrates a white rim macro module (having white colored rim unit modules 200), whereas FIG. 4B illustrates a black rim macro module (having black colored rim unit modules 200). As mentioned earlier, the cluster unit modules 300 and the data unit modules 100 are positioned within the rim unit modules 200. The cluster unit modules 300 could be located at any position in the rectangular array except the rim of the respective macro module.

Figure 5:
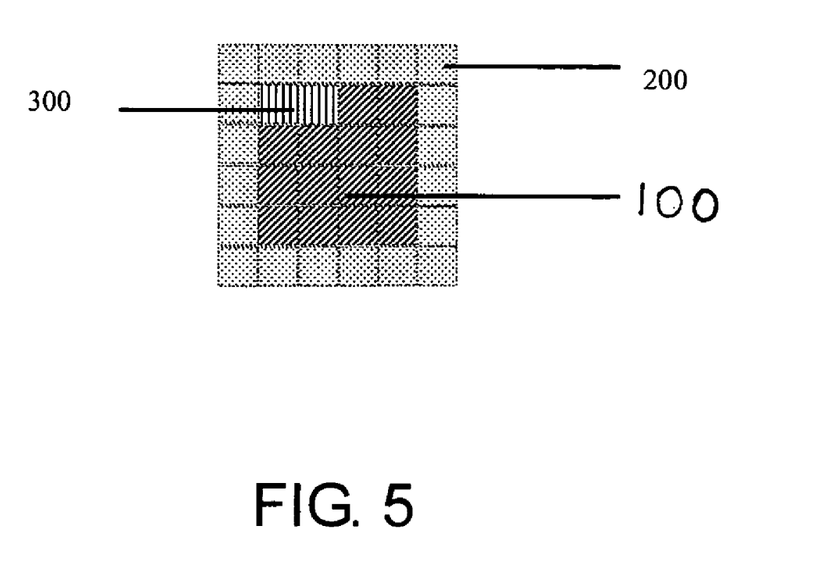
FIG. 5 is a schematic diagram of a macro module according to the above preferred embodiment of the present invention.

Referring to FIG. 5 of the drawings, a detailed manifestation of one of the macro module of the present invention is illustrated, in which each row of the macro module has six unit modules, totaling of altogether thirty six unit modules for that particular macro module. Moreover, there are total of twenty rim unit modules 200 formed as the rim of that macro module. A total of fourteen data unit modules 100 and two cluster unit modules 300 are located inside and surrounded by the rim.

Figure 6:
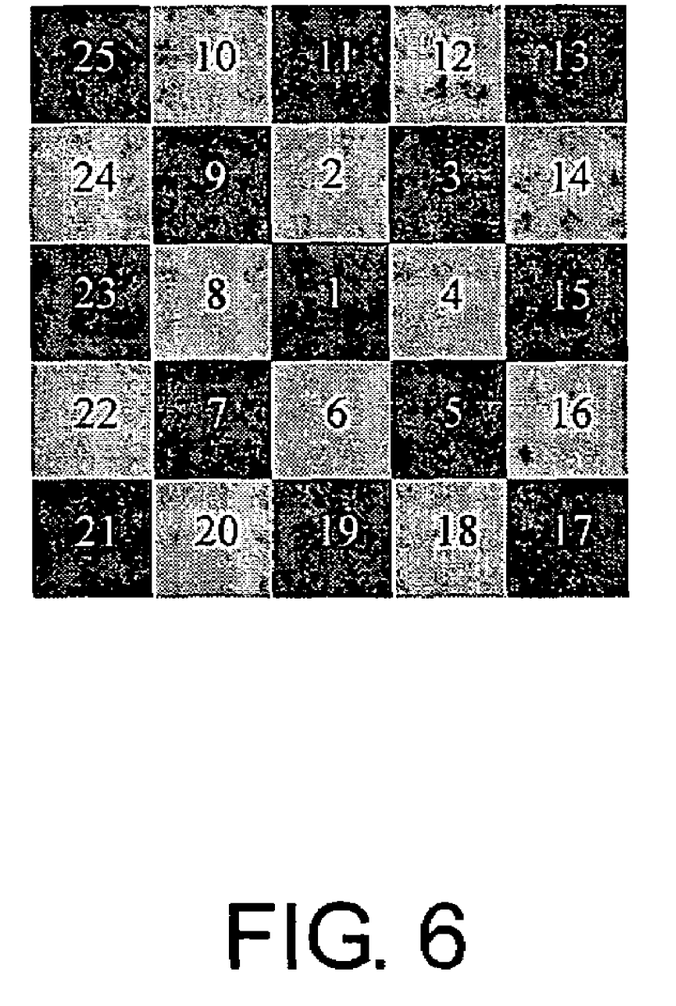
FIG. 6 is a schematic diagram illustrating a sequence of the macro module in the two-dimensional barcode according to the above preferred embodiment of the present invention.

FIG. 6 illustrates an arrangement of the macro modules in a particular two-dimensional barcode. The dark macro modules shown in FIG. 6 (e.g. macro module 1) represent the macro modules which have a black rim formed by a plurality of black rim unit modules 200. Similarly, the light macro modules shown in FIG. 6 (e.g. macro module 2) represent the macro modules which have a white rim formed by a plurality of white rim unit modules 200. It is worth mentioning that the black rim macro modules and the white rim macro modules are alternately arranged in both the horizontal and vertical directions along the rectangular array.

The sequence numbers as shown in FIG. 6 denote the order by which macro modules are arranged in the rectangular array. The sequence also denotes the order by which the codewords are stored within each of the data unit modules 100. According to the preferred embodiment, the arranging sequence starts from a center of the rectangular array and continues along a route which spirally proceeds from that center in a clockwise direction with respect to the barcode to reach the outmost layer of the rectangular array. As shown in FIG. 6 of the drawings, the sequence starts on "1" and ends at "25".

In other words, all of macro modules of the two-dimensional bar code are arranged sequentially one by one in the above-mentioned spiral manner.

According to the preferred embodiment, each side of the two-dimensional barcode has Mnum macro modules (Mnum being an odd number greater than 1) and therefore the entire barcode has altogether Mnum×Mnum macro modules. It is convenient to group all those macro modules into layers in which macro module "1" is identified as a first layer, macro modules "2" to "9" form the second layer, macro modules "10" to "25" form the third layer, so on and so forth. It is worth mentioning that the macro modules in the same layer use would be assigned the same cluster number.

Moreover, according to the preferred embodiment, the cluster number of the first layer of macro modules would be designated as cluster 0, the second layer cluster 1, and the third layer cluster 2, so on and so forth. The cluster unit modules 300 within each layer of macro modules is utilized to store the cluster number within that layer. If the cluster number, stored in binary form, goes beyond the storage limit of the relevant cluster unit modules 300, an arithmetic modulo operation is performed on the maximum value which is capable of being encoded in the cluster unit modules 300.

The arithmetic modulo operation is that the cluster number of a particular macro module is determined from the layer number as follows:

cluster number=(layer number) mod 4 where "mod 4" is the remainder after division by four.

The layer in which the macro module is located MODULO the maximum storing value of the cluster unit module. For instance, every macro module has two cluster unit modules, and then the cluster numbers are respectively 0, 1, 2, 3, 0, 1, 2, 3, . . . . That is, each cluster repeats sequentially every four layer.

From the forgoing descriptions, it can be shown that the effect of accidental damage to the two-dimensional barcode can be minimized the information stored in the barcode is individually and separately stored in each macro module and that the outermost layer of each macro module, i.e. the rim unit modules 200, is utilized only for identification purpose, and not for information storage.

Figure 7:
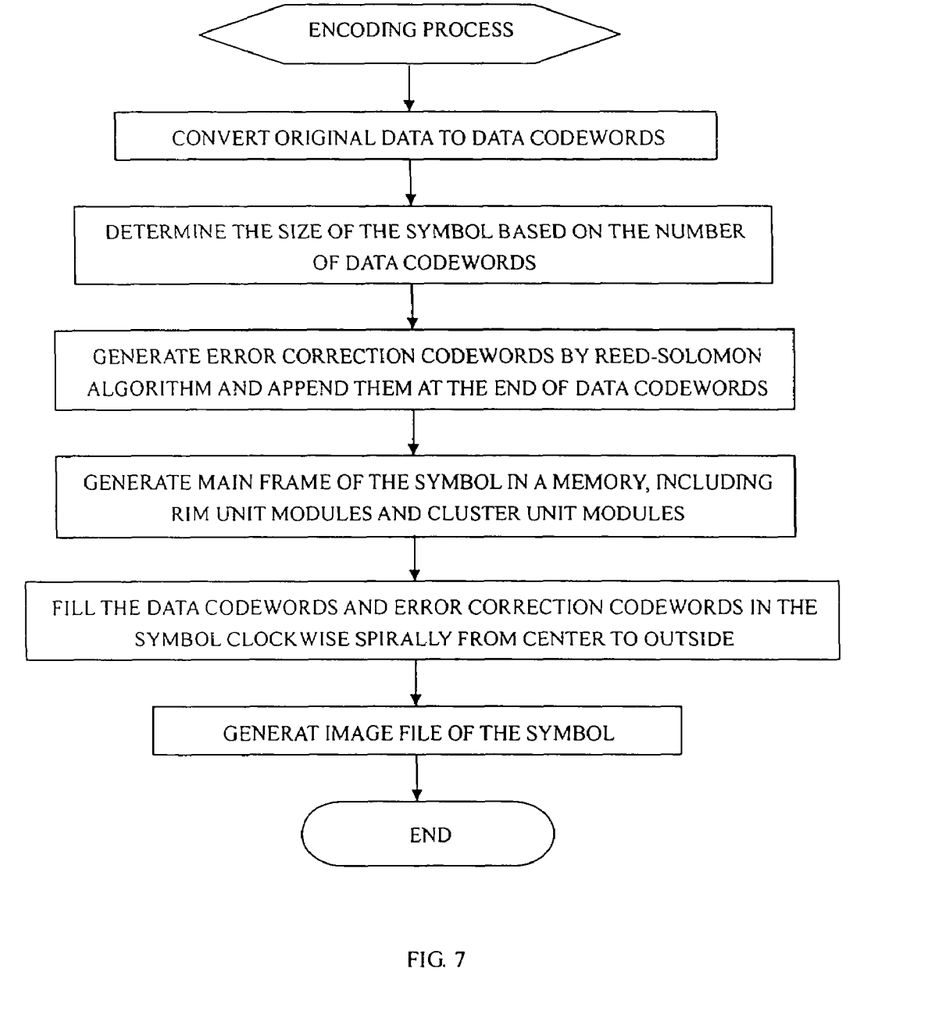
FIG. 7 is a flow diagram of an encoding method from a predetermined set of information to the two-dimensional barcode according to the above preferred embodiment of the present invention.

Referring to FIG. 7 if the drawings, a method of encoding a predetermined set of data in a form of binary stream to the above-mentioned two-dimensional barcode is illustrated. The encoding method comprises the steps of:

(a) dividing the binary data stream into data codewords having a predetermined bit length, wherein each of the data codewords form a macro module of the two-dimensional barcode, and the macro modules form a two-dimensional array in a predetermined order; and (b) for each of the macro module of the respective data codewords, generating a predetermined number of rim unit modules, a predetermined number of cluster unit modules storing a predetermined position of the respective macro module in the two-dimensional array, and a predetermined number of data unit modules storing the respective data codewords.

In order to further enhance the accuracy of the two-dimensional barcode, the encoding method further comprises a step (c) in between step (a) and step (b) of generating an error correction codewords by the use of Reed-Solomon algorithm and appending at the end of the data codewords.

The size of the two-dimensional barcode is determined by the amount of data codewords and error correction codewords. The data codewords and the error correction codewords are filled into the data unit modules 100 in the above-mentioned clockwise spiral manner starting from the center of the respective macro module. Consequently the image file of the barcode would be generated.

Referring to FIG. 8 to FIG. 13 of the drawings, schematic diagrams of a decoding method from the two-dimensional barcode back to a predetermined set of data is illustrated. Essentially, the decoding procedure is the reverse method of the above-mentioned encoding procedure. However, the substantive steps vary considerably.

The method of decoding a two-dimensional barcode into a predetermined set of data comprises the steps of:

(1) capturing the two-dimensional barcode to generate a gray scale digital image having a gray value for each pixel of the digital image;

(2) computing the gray values of the pixels to obtain a distribution of the gray values for determining a threshold value for each of the pixel;

(3) converting the gray scale image into a bilevel image having two contrasting color levels;

(4) identifying each of the unit modules from the gray scale image for each of the macro modules;

(5) retrieving a bit value of each of the unit modules in a predetermined order to obtain a data bit stream of each of the macro module; and (6) combining the data bit streams of each of the macro module to form a binary stream of data for the two-dimensional barcode.

According to the preferred embodiment, step (4) above comprises the steps of:

(4.1) determining a boundary of each of the pixels from the bilevel image to form a borderline of a macro module represented by the pixel; and (4.2) interpolating a coordinate of each of the unit module within each of the macro module.

Moreover, the decoding method further comprises a pre-step, prior to the step (1), of obtaining a size of the macro module. The pre-step involves the determination of the total number of unit modules which are required in one particular macro module, and the determination of the location of the cluster unit modules 300 in the respective macro module. It is worth mentioning that these values can be utilized for interpolation in step (4.2).

In step (1) above, the gray scale image of the two-dimensional barcode is obtained by taking a picture via a digital camera. This gray scale image may be stored in a memory as a pixel matrix containing the gray value of every pixel, also may be showed on the display directly.

Figure 13:
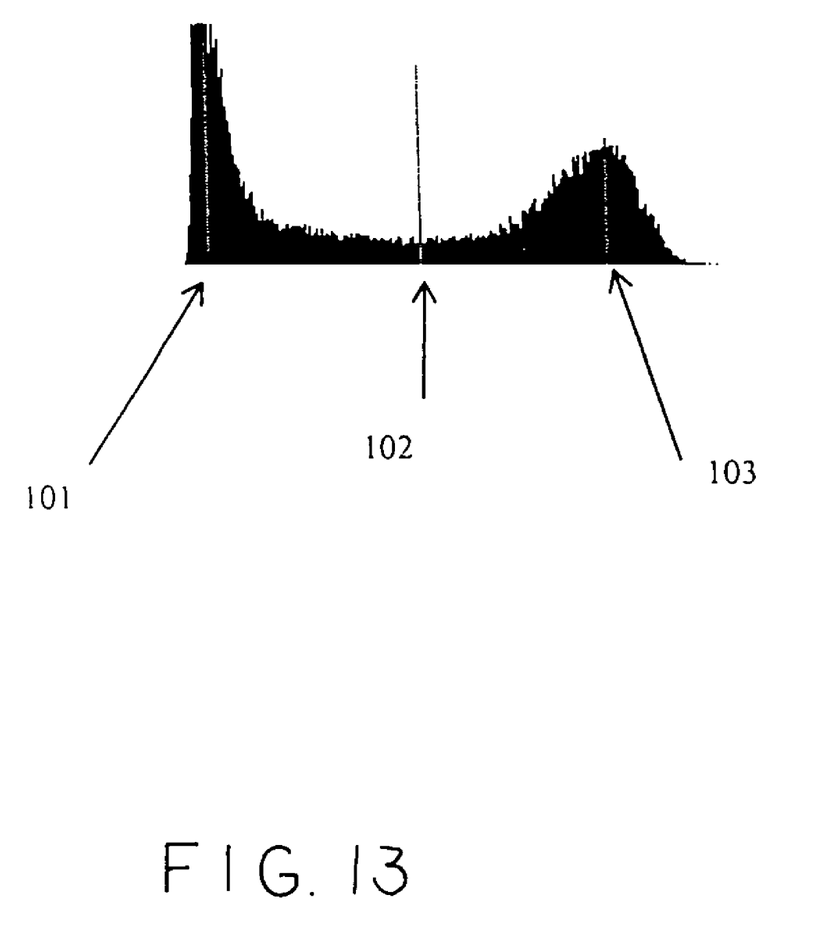
FIG. 13 is a histogram representation of the grey scale image according to the preferred embodiment of the present invention.

In step (2) above, distributed statistical computation is performed on the gray values of different pixels of the gray scale image, such as a histogram representation as shown in FIG. 13 of the drawings. In the drawings, there are obvious double peaks of which the left peak value 101 represents the amount of light colored pixels and the right peak value 103 represents the amount of dark colored pixels. The gray value 102 between these two peaks is use as a threshold value for binarization. In other words, the threshold value is obtained by truncating the right peak value 103 and the left peak value 101 of the distributed statistical computation representation, i.e. the histogram.

Figure 8:
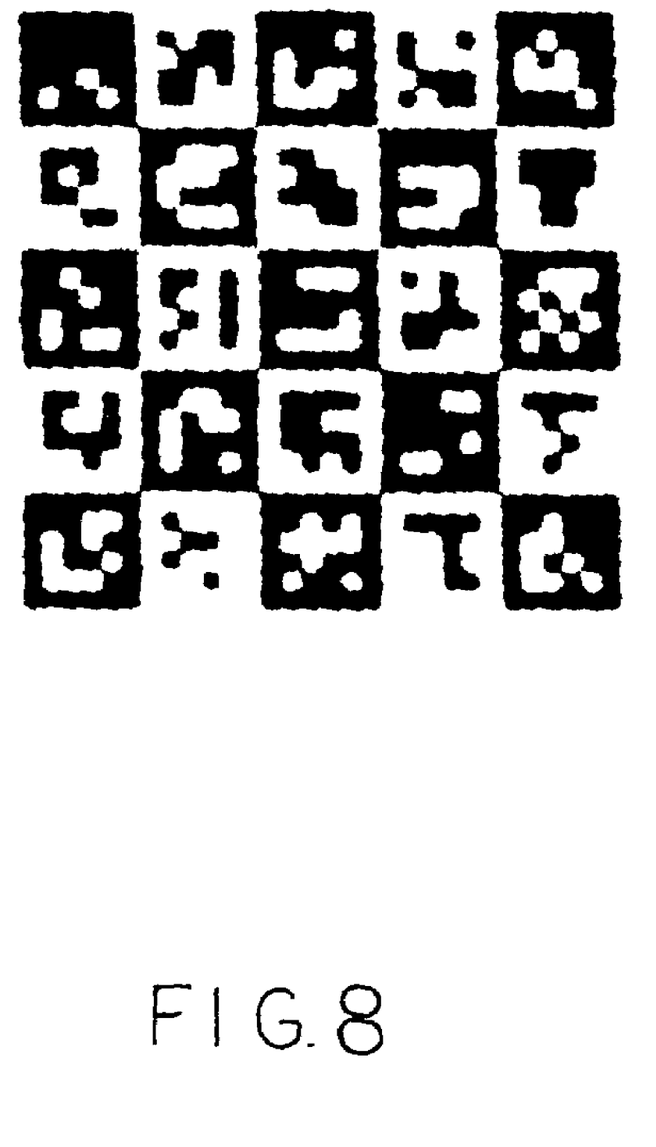
FIG. 8 is a bilevel image of the two-dimensional barcode according to the above preferred embodiment of the present invention.

In step (2) and step (3) above, the threshold value has been determined by the distribution of gray values of different pixels. Then the gray scale image is converted to a bilevel image, i.e. an image having only two levels of color. The method of determining the threshold value is preferably embodied as by histogram double peak technique. Referring to FIG. 8 of the drawings, a bilevel image is obtained by the histogram double peak technique. Note that the values of all pixels only represent either dark color or light color.

Moreover, for the bilevel image, the edges or borderline detection would be carried out. Every light colored pixel is compared with its adjacent pixels, i.e. top, bottom, left, right adjacent pixels. After that, the particular light colored pixel is marked as a boundary pixel if there is one or more than one dark colored pixel among those four adjacent pixels.

Figure 9:
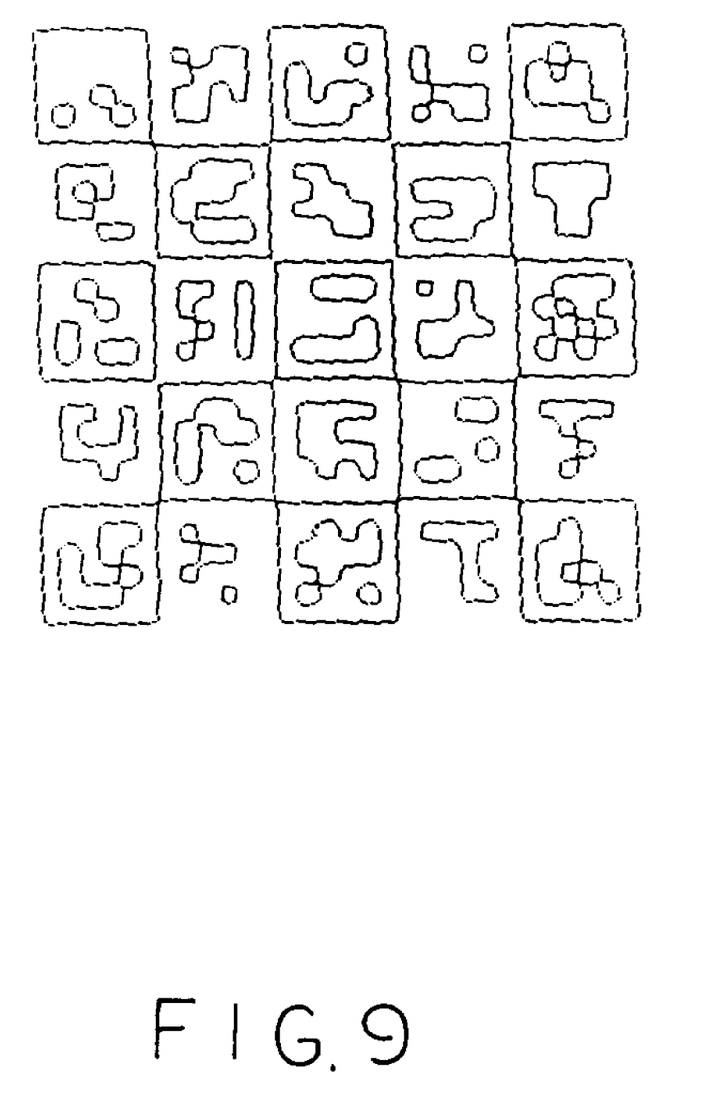
FIG. 9 is a boundary image of a two-dimensional barcode according to the above preferred embodiment of the present invention.

Similarly, every dark colored pixel is compared with its respective adjacent pixels, i.e. top, bottom, left, and right pixels. The dark colored pixel will also marked as boundary pixel if there is one or more than one light colored pixel among its adjacent pixels. FIG. 9 illustrates a boundary image of a particular barcode.

Figure 10:
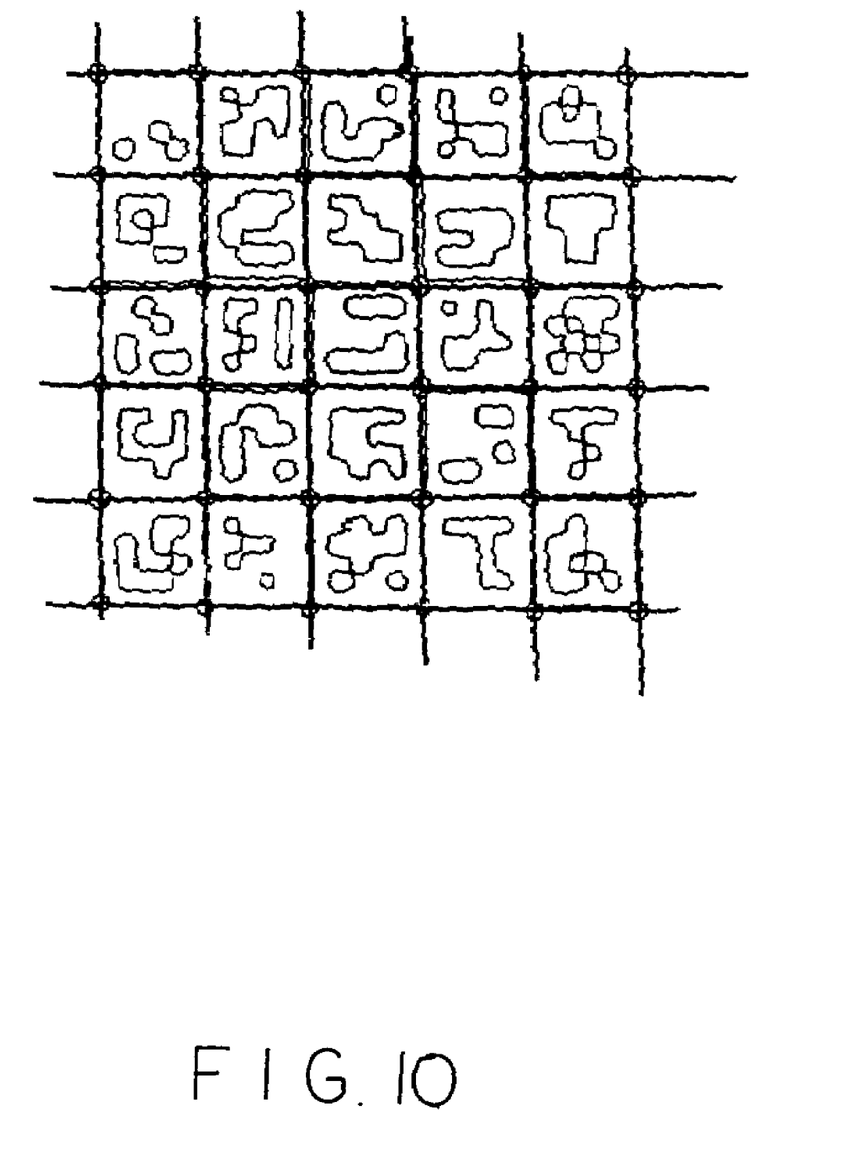
FIG. 10 is a schematic diagram of a two-dimensional barcode according to the above preferred embodiment of the present invention, wherein the macro modules are identified by solving the system of linear equations.
Figure 11:
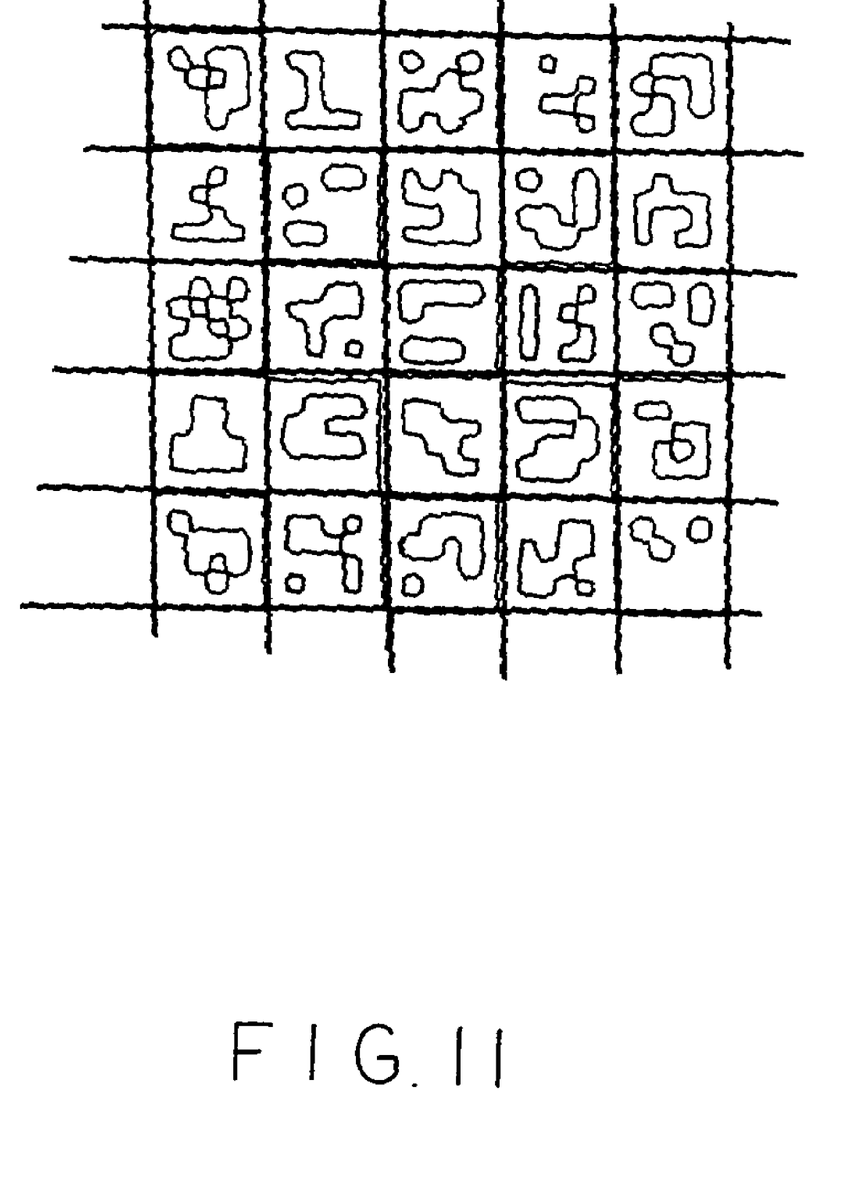
FIG. 11 is a schematic diagram of obtaining the coordinates of macro modules of a particular two-dimensional barcode, as solved by the system of linear equations as provided in the decoding method according to the above preferred embodiment of the present invention.

In step (4.2) above, a system of linear equations can be obtained by detecting straight lines (including continuous or non-continuous) which are determined from step (4.1) as boundary images between two relevant pixels. It is worth mentioning that because of the alternate arrangement of the white rim macro modules and the black rim macro modules in the barcode, the detected straight lines will cut and partition the entire barcode into the macro modules. FIG. 10 of the drawings illustrate that the macro modules are divided from a grey scale digital image. Hough Transform is utilized to generate the image. Moreover, the coordinates of four corners of every macro module are obtained by solving above-mentioned system of linear equations, as shown in FIG. 11 of the drawings.

Step (4.2) above further comprises the steps of:

(4.2.1) determining a center coordinate of each of the unit modules by interpolation from four corner coordinates of the respective unit module of the corresponding macro module the corner coordinates of which are calculated from the system of equations;

(4.2.2) for every center coordinate, retrieving a bit value stored in each of the unit modules from the bilevel image; and (4.2.3) formulating a data codewords matrix from a bit value of each of the unit modules of the corresponding macro module.

It is worth mentioning that the bit values stored in the unit modules can also be determined by the statistical value of pixels around the respective center coordinates. The data codewords matrix contains data codewords and error correction codewords, each codeword having the information of cluster number that needs to be removed before error correction.

In between step (4) and step (5), the decoding method further comprises a step (4.3) of determining and adjusting an orientation of the two dimensional bar-code. This additional step is required because it is likely that when the gray scale image is take from a digital camera, the image does not represent a desire orientation as compatible with an coordinate system on which the above-mentioned system of equations are found. In other words, the coordinates solved may be of little practical accuracy.

According to the preferred embodiment, step (4.3) comprises the steps of:

(4.3.1) for each of the unit module, obtaining cluster number based on first through four different predetermined orientations;

(4.3.2) for each of the orientations, computing an absolute value of a different between a first cluster number of the respective macro module and a second cluster number of an adjacent right macro module, and a third cluster number of an adjacent bottom macro module;

(4.3.3) for each of the orientations, summing up the first cluster number, the second cluster number, and a third cluster number to obtain an orientation score; and (4.3.4) comparing every orientation score and adopting an orientation among first through four orientation as a correct orientation which has a lowest orientation score among all orientation scores obtained.

From statistical point of view, every macro module of right orientation scoring 1 averagely and that every macro module of wrong orientation scoring 3 averagely, i.e.:

$$(0+1+2+3)/4 \times 2 = 3.$$

It is worth mentioning that the central codeword of the barcode may be determined according to the symmetry of data codewords matrix. However there are many possibilities in practices. For example, the data codewords matrix may lack one row of data codewords in a symbol with 5×5 macro modules. Then its central macro module has two possibilities.

For every possible central macro module, some computations of cluster number should be performed to choose an exact central macro module. For instance, for each candidate central data codeword, the possible cluster number of the first layer of data codewords around the candidate central data codeword is 1 according to the spiral rule as above-mentioned. And the possible cluster number of the second layer of data codewords around the candidate central data codeword is 2. The possible cluster number of every macro module is decided by its location or the layer in which the macro module is located. Then the absolute value of the difference between the actual cluster number (read from the image) and the possible cluster number of every macro module is calculated for every macro module. And then these absolute values are added up together to get a score for the candidate central macro module. The scores for different candidate central macro modules are compared and the candidate central macro module with the minimum score is determined as the right center.

On the basis of above computing result, the data codewords are read according to right central macro module and right orientation. Possible errors in the codewords are corrected by use of Reed-Solomon error correction algorithm. If the error correction succeeds and the data codewords are outputted, byte data is then recovered from the data codewords. The decoding method ends.

As an alternative, step (2) comprises the steps of:

(2.1) dividing the gray scale digital image in a predetermined number of segments;

(2.2) for each of the segments, computing a segment grey value; and (2.3) averaging the segment grey values to obtain a segment threshold value for each of the segments so as to determine a weighted average threshold value of the entire gray scale image.

Note that the gray scale image can be divided into non-overlapped or partially overlapped several segments, and the weighted average would take into account of these overlapping.

Figure 12:
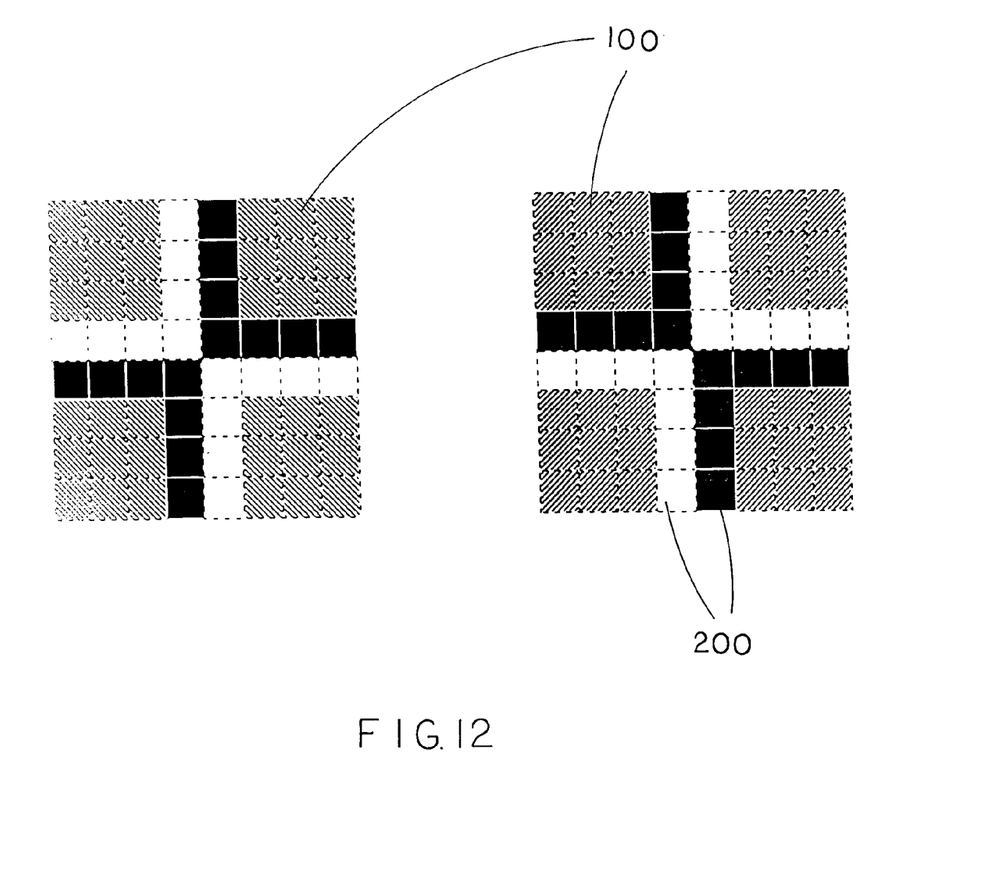
FIG. 12 is a schematic diagram of a gray-scale graphical representation at corners of macro modules according to the above preferred embodiment of the present invention, illustrating that the rims of the macro modules are alternatively arranged.

As mention earlier, the two-dimensional barcode of the present invention adopts alternate arrangement of white rim macro modules and black rim macro modules, accordingly at the joint of different macro modules, namely at four corners of the macro modules forms special graphic pattern. Referring to FIG. 12 of the drawings, a special graphic pattern at the four corners of the relevant macro modules of the barcode is illustrated.

As shown in FIG. 12, the gray area does not belong to the template content that only includes dark colored and light colored areas. Accordingly, as an alternative to equations solving as mentioned above, step (4) comprises the steps of:

(4.1') matching a predetermined matching area of the grey scale image with a predetermined number of templates, wherein each of the templates is oriented to substantially align with the grey scale image; and (4.2') comparing an image feature of the templates with the respective grey-scale image to identify macro modules and unit modules of the grey-scale image.

The orientation of the templates can be matched with that of the barcode by rotating the template to have the same angle as the barcode. In step (4.2') the image feature is preferably compared by statistically computing the amount of the same pixels in the overlapped area of the template and image, wherein the statistical value would be large (near the total amount of template pixels) if the matching area has the same image feature with the template. The statistical value would be small (near zero) if the matching area is entirely having inverse color with the template. In less extreme cases, the statistical value would be medium, meaning that the statistical value of pure black or pure white area is half of the total amount of template pixels.

The smaller the size of the template, the less computational effort is needed, but the possibility of wrong matching is higher. Conversely, if the size of the template is bigger, the computational effort would become more demanding, but the possibility of wrong matching is lower. According to the preferred embodiment, a template with 32×32 pixels is utilized, wherein a length of black/white bar in the template is 4 pixels.

The objective of template matching is to find if in the specified area of the image exists same or similar pattern to the template. Through template matching, every macro module can be detected and located quickly and reliably. Because of alternate arrangement of white rim macro modules and black rim macro modules, distinct borderlines or edges exist between every macro module and its adjacent macro modules. Then distinct characteristic straight lines form at the edges of the macro modules after edge detecting in the bilevel image. Consequently the angle of rotation of the symbol can be determined and the macro modules can be located quickly.

As mentioned earlier, each macro module includes cluster unit modules 300. Each codeword corresponds to a macro module. Total codewords are divided into clusters and arranged in layers clockwise spirally from the center to outside. The codewords in the same layer use the same cluster number. The cluster number is back to 0 when it reaches the maximum. This kind of arrangement can reliably guide the decoding algorithm to find the orientation of the symbol and the starting codeword.

Because of cross spread of white rim macro modules and black rim macro modules, the dark colored modules and the light colored modules are distributed uniformly in the symbol, that avoids the funnel effect of symbol recognition and reduces the possibility of codewords error.

During encoding method, the error correcting operation on the bits stream of divided codewords is performed under a predetermined error correction level. Therefore the barcode has no need for format information portion that is a vulnerable region. Comparing with prior two-dimensional bar code, present invention does not have this vulnerable region, so the reliability of the barcode is substantially improved.

Moreover, because every macro module can be separately located, even though the barcode is damaged or stained, it can still be effectively recognized. Comparing with prior two-dimensional barcode symbol of matrix type, the recognition algorithm can effectively detect the existence of erasure error and accordingly improve the error correction capability. In codewords stream, for RS error correction algorithm, the error correction capability for erasure error is the double of the error correction capability for substitute error. Therefore the present invention convincingly guarantees the capabilities of anti-damage, anti-stain and anti-deformation of the two-dimensional barcode.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A two-dimensional barcode comprising a plurality of macro modules arranged in a two-dimensional array in a predetermined order, wherein each of said macro modules comprises:

a predetermined number of rim unit modules each of which defining a boundary of said respective macro modules, wherein said rim unit modules of every two of said neighboring macro modules are contrasting with each other to enhance identification of said two macro modules;

a predetermined number of data unit modules confined within said respective rim unit module to store data codewords of a predetermined binary stream of bits for said respective data unit module; and a predetermined number of cluster unit modules confined within said respective rim unit to store a predetermined cluster number which represents an encoding order of said corresponding macro module in said two dimensional array;

wherein said two dimensional array of said macro modules is adapted to encode data into binary form, in such a manner that said contrasting rim unit modules of each of said macro modules maximizes an accuracy with which said macro modules are decoded in an ordered manner in responsive to said cluster number.

2. The two-dimensional barcode, as recited in claim 1, wherein said macro modules of said two-dimensional barcode are arranged in a sequence which starts from a center of said two-dimensional barcode, and continues along a route which spirally proceeds from said center in a clockwise direction with respect to said two-dimensional barcode to allocate positions of all said macro modules so as to form said two dimensional array.

3. The two-dimensional barcode, as recited in claim 2, wherein for each two of said macro modules, said rim unit modules of one of said macro modules are black colored to form black rims of said respective macro modules, and said rim unit modules of another of said macro modules is white colored to form white rims of said respective macro modules, wherein said black rims and said white rims are arranged alternatively along a vertical and a horizontal direction within said two dimensional array such that said rim unit modules of said two adjacent macro modules are maximally contrasting with each other to minimize reading error of said two-dimensional barcode when said two dimensional array is being decoded.

4. The two-dimensional barcode, as recited in claim 3, wherein said data unit modules are dark colored and light colored to store two different bit values of binary representation respectively, wherein a bit value of 0 is assigned to each light colored data unit module, and a bit value of 1 is assigned to each dark colored data unit module, said data unit modules are arranged in a predetermined array to represent said data codewords in said binary form.

5. The two-dimensional barcode, as recited in claim 4, wherein said macro modules of said two dimensional array is divided into a plurality of layers each having a corresponding layer number dictating said order of decoding said two dimensional array, wherein said cluster number stored in each of said macro modules within said same layer contain information representing said corresponding layer number, so that said macro modules in same said layer have same layer number represented by said corresponding cluster number.

6. A method of encoding a predetermined set of data in a binary stream into a two-dimensional barcode, comprising the steps of:
(a) dividing said binary data stream into data codewords having a predetermined bit length, wherein each of said data codewords forms a macro module of said two-dimensional barcode, and said macro modules form a two-dimensional array in a predetermined order; and
(b) for each of said macro modules of each of said data codewords, generating a predetermined number of rim unit modules forming a rim of said corresponding macro module which contrasts with rim unit modules of an adjacent macro modules, a predetermined number of cluster unit modules storing a predetermined position of said corresponding macro module in said two-dimensional array, and a predetermined number of data unit modules storing said corresponding data codewords, wherein said two dimensional array of said macro modules are capable of systematically encoding data into binary form, in such a manner that said contrasting rim unit modules are adapted to maximize an accuracy with which said macro modules are decoded.

7. The encoding method, as recited in claim 6, wherein said macro modules of said two-dimensional barcode are arranged in a sequence which starts from a center of said two-dimensional barcode, and continues along a route which spirally proceeds from said center in a clockwise direction with respect to said two-dimensional barcode to allocate positions of all said macro modules so as to form said two dimensional array.

8. The two-dimensional barcode, as recited in claim 7, wherein said data unit modules are dark colored and light colored to store two different bit values of binary representation respectively, wherein a bit value of 0 is assigned to each light colored data unit module, and a bit value of 1 is assigned to each dark colored data unit module.

9. The encoding method, as recited in claim 8, wherein said rim unit modules of said macro modules are black colored to form black rims of said respective macro modules, and white colored to form white rims of said respective macro modules, wherein said black rims and said white rims are arranged alternatively along a vertical and a horizontal direction within said two dimensional array, wherein said black rims and said white rims are arranged alternatively along a vertical and a horizontal direction within said two dimensional array such that said rim unit modules of said two adjacent macro modules are maximally contrasting with each other to minimize reading error of said two-dimensional barcode when said two dimensional array is being decoded.

10. The two-dimensional barcode, as recited in claim 9, wherein said macro modules form a plurality of layers each representing a same cluster number stored by said cluster unit modules of each of said macro modules positioned within a same layer, such that a position of each of said macro modules within said two dimensional array is identified by said cluster number.

11. A method of decoding a two-dimensional barcode comprising a plurality of macro modules into a predetermined set of data, wherein said decoding method comprises the steps of:
(1) capturing said two-dimensional barcode to generate a gray scale digital image having gray value for each pixel of said digital image;
(2) computing said gray values of said pixels to obtain a distribution of said gray values for determining a threshold value for said digital image;
(3) converting said gray scale image into a bilevel image having two contrasting color levels;
(4) identifying each of said unit modules from said digital image for each of said macro modules;
(5) retrieving a bit value of each of said unit modules in a predetermined order to obtain a data bit stream of each of said macro modules; and
(6) combining said data bit streams of each of said macro modules to form a binary stream of data for said two-dimensional barcode.

12. The decoding method, as recited in claim 11, wherein said step (4) comprises the steps of:
(4.1) determining a boundary of each of said pixels from said bilevel image to form a borderline of a macro module represented by said pixel; and
(4.2) interpolating a coordinate of each of said unit module within each of said macro module.

13. The decoding method, as recited in claim 12, wherein said step (4.2) comprises the steps of:
(4.2.1) determining a center coordinate of each of said unit modules by interpolation from four corner coordinates of said respective unit module of said corresponding macro module corner coordinates of which are calculated from said system of equations;
(4.2.2) for each of said center coordinates, retrieving a bit value stored in each of said unit modules from said bilevel image; and (4.2.3) formulating a data codewords matrix from said bit value of each of said unit modules of said corresponding macro module.

14. The decoding method, as recited in claim 13, further comprising a step (4.3), in between said step (4) and said step (5), of determining and adjusting an orientation of said two dimensional barcode so as to accurately decode said two dimensional barcode into said data.

15. The decoding method, as recited in claim 14, wherein said step (4.3) comprises the steps of:
(4.3.1) for each of said unit modules, obtaining cluster number based on first through four different predetermined orientations of said two dimensional barcode;
(4.3.2) for each of said orientations, computing an absolute value of a different between a first cluster number of the respective macro module, a second cluster number of an adjacent right macro module, and a third cluster number of an adjacent bottom macro module;
(4.3.3) for each of the orientations, summing up said first cluster number, said second cluster number, and said third cluster number to obtain an orientation score; and
(4.3.4) comparing each of said orientation scores and adopting an orientation among said first through four orientation as a correct orientation which has a lowest orientation score among each of said orientation scores obtained.

16. The decoding method, as recited in claim 15, wherein in said step (2), said grey value is obtained by distributed statistical computation of said pixels of said grey scale image, and said threshold value is obtained by truncating peak values of said distributed statistical computation.

17. The decoding method, as recited in claim 15, wherein said step (2) comprises the steps of:

(2.1) dividing said grey scale digital image in a predetermined number of segments;
(2.2) for each of said segments, computing a segment grey value; and
(2.3) averaging said segment grey values to obtain a segment threshold value for each of said segments so as to determine a weighted average threshold value of said gray scale image.

18. The decoding method, as recited in claim 11, wherein said step (4) comprises the steps of:
(4.1') matching a predetermined matching area of said grey scale image with a predetermined number of templates, wherein each of said templates is oriented to substantially align with said grey scale image; and
(4.2') comparing an image feature of said templates with said respective grey-scale image to identify said macro modules and said unit modules of said grey-scale image.

19. The decoding method, as recited in claim 18, in said step (2), said grey value is obtained by distributed statistical computation of said pixels of said grey scale image, and said threshold value is obtained by truncating peak values of said distributed statistical computation.

20. The decoding method, as recited in claim 18, wherein said step (2) comprises the steps of:
(2.1) dividing said grey scale digital image in a predetermined number of segments;
(2.2) for each of said segments, computing a segment grey value; and
(2.3) averaging said segment grey values to obtain a segment threshold value for each of said segments so as to determine a weighted average threshold value of said gray scale image.

* * * * *